(12) United States Patent
Kawabe

(10) Patent No.: US 8,228,562 B2
(45) Date of Patent: Jul. 24, 2012

(54) IMAGE PROCESSING APPARATUS

(75) Inventor: Toru Kawabe, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 665 days.

(21) Appl. No.: 12/410,356

(22) Filed: Mar. 24, 2009

(65) Prior Publication Data

US 2009/0257093 A1    Oct. 15, 2009

(30) Foreign Application Priority Data

Apr. 9, 2008 (JP) ................................. 2008-101362

(51) Int. Cl.
*H04N 1/405* (2006.01)

(52) U.S. Cl. ........................ 358/3.27; 358/533; 358/448

(58) Field of Classification Search ........ 358/3.26–3.27, 358/3.07–3.08, 1.9, 2.1, 520, 533–534, 443, 358/448

See application file for complete search history.

(56) References Cited

U.S. PATENT DOCUMENTS 5,268,771 A * 12/1993 Murakami et al. ............ 358/448

FOREIGN PATENT DOCUMENTS

JP    2004-295318    10/2004

* cited by examiner

*Primary Examiner* — Thomas D Lee
*Assistant Examiner* — Stephen M Brinich
(74) *Attorney, Agent, or Firm* — Squire Sanders (US) LLP

(57) ABSTRACT

Described is an image processing apparatuses, which makes it possible to accurately remove a periodicity from a halftone dot pattern included in an image. The apparatus includes: a periodicity pattern analyzing section to acquire periodicity information indicating the periodicity of the halftone dot pattern; a smoothing area determining section to determine a smoothing area, constituted by either a pair of rectangular areas contacting with each other or a single rectangular area, based on the periodicity information; a spatial filter creating section to create a spatial filter within which the smoothing area is includible, and in which a weighted coefficient of each of pixels is established corresponding to an overlapping area of a concerned pixel overlapping with the smoothing area; and a smoothing calculation section that applies a convolution arithmetic calculation processing to the image data representing the processing objective image with the spatial filter.

6 Claims, 15 Drawing Sheets

$$K = 255 - \max(R,G,B)$$

$$\begin{pmatrix} C \\ M \\ Y \end{pmatrix} = \begin{pmatrix} 255 - K \\ 255 - K \\ 255 - K \end{pmatrix} - \begin{pmatrix} 1 & 0 & 0 \\ 0 & 1 & 0 \\ 0 & 0 & 1 \end{pmatrix} \begin{pmatrix} R \\ G \\ B \end{pmatrix}$$

"EXAMPLE 1"

"EXAMPLE 2"

"EXAMPLE 3"

"EXAMPLE 4"

FIG. 13

| No | RESTRICTION ITEM | DETERMINATION CONDITION | WHEN YES | WHEN NO |
|---|---|---|---|---|
| 1 | SUPPRESSING NUMBER OF LINE BUFFERS | $t_1 \cdot \sin \alpha + t_2 \cdot \cos \beta \leq N_{max}$ (MAXIMUM VALUE OF LINE BUFFER) | ARBITRAL (SELECTING BASED ON OTHER RESTRICTION CONDITION) | ESTABLISHING SMOOTHING AREA FORMED BY CONNECTING RECTANGULAR AREA A AND RECTANGULAR AREA B WITH EACH OTHER IN HORIZONTAL DIRECTION |
| 2 | SUPPRESSING LENGTH OF LINE BUFFER | $t_1 \cdot \cos \alpha + t_2 \cdot \cos \beta \leq M_{max}$ (MAXIMUM LENGTH OF LINE BUFFER) | ARBITRAL (SELECTING BASED ON OTHER RESTRICTION CONDITION) | ESTABLISHING SMOOTHING AREA FORMED BY CONNECTING RECTANGULAR AREA A AND RECTANGULAR AREA B WITH EACH OTHER IN VERTICAL DIRECTION |
| 3 | GIVING IMPORTANCE TO SHARPNESS OF SPECIFIC BACKSIDE IN CHARACTER, ETC. | DIRECTION OF THIN LINE (HORIZONTAL DEPICTION OF MINCHOUTAI CHARACTER, ETC.) IS HORIZONTAL | ESTABLISHING SMOOTHING AREA FORMED BY CONNECTING RECTANGULAR AREA A AND RECTANGULAR AREA B WITH EACH OTHER IN HORIZONTAL DIRECTION | ESTABLISHING SMOOTHING AREA FORMED BY CONNECTING RECTANGULAR AREA A AND RECTANGULAR AREA B WITH EACH OTHER IN VERTICAL DIRECTION |

| 0.25 | 0.5 | 0.5 | 0.44 | 0 |
|---|---|---|---|---|
| 0.5 | 1 | 1 | 0.88 | 0 |
| 0.5 | 1 | 1 | 0.99 | 0.45 |
| 0.5 | 1 | 1 | 1 | 0.5 |
| 0.4 | 0.8 | 0.8 | 0.8 | 0.4 |

TOTAL AREA: 16.2

NORMALIZATION

| 0.0154 | 0.0309 | 0.309 | 0.270 | 0 |
|---|---|---|---|---|
| 0.309 | 0.617 | 0.617 | 0.540 | 0 |
| 0.309 | 0.617 | 0.617 | 0.610 | 0.278 |
| 0.309 | 0.617 | 0.617 | 0.617 | 0.309 |
| 0.247 | 0.494 | 0.494 | 0.494 | 0.247 |

IMAGE PROCESSING APPARATUS

This application is based on Japanese Patent Application NO. 2008-101362 filed on Apr. 9, 2008, with Japan Patent Office, the entire content of which is hereby incorporated by reference.

BACKGROUND OF THE INVENTION

The present invention relates to an image processing apparatus that removes periodicity, caused by an influence of a halftone dot pattern, from an image formed through a halftone dot processing.

When a size enlargement/reduction processing is applied to an image formed through a halftone dot processing, deterioration of the image quality is caused by the fact that its halftone dot pattern has been also enlarged or reduced. Accordingly, it has been performed to remove the periodicity, residing in the halftone dot pattern, from the image concerned, before applying an image processing, such as the size enlargement/reduction processing, etc.

However, when a smoothing processing employing a spatial filter, such as a Gaussian filter, etc., is applied to the image so as to remove the periodicity abovementioned, unless the size of halftone dot pattern (a number of halftone dot lines) applied to an image to be processed (hereinafter, also referred to as a processing objective image) is fitted to that of the Gaussian filter to be employed, the effect of removing the periodicity would become insufficient, or otherwise, edge portions of partial images, such as characters, etc., would be excessively smoothed.

To overcome the abovementioned shortcoming, for instance, Tokkai 2004-295318 (Japanese Non-Examined Patent Publication) sets forth the image processing apparatus that generates plural kinds of image data, each of which is processed by each of Gaussian filters having different sizes of halftone dot pattern, so as to calculate each of dispersion values for each of the processed image data, and then, specifies a specific Gaussian filter having an optimum size of halftone dot pattern, based on the dispersion values calculated in the above.

In this connection, one periodical area of a halftone dot pattern is liable to form a rhombus or a parallelogram. Accordingly, when a normal Gaussian filter, such as a 3×3 pixel filter, a 5×5 pixel filter, etc., is employed for this purpose, it has been quite difficult to achieve such a skilled filtering operation that makes it possible to accurately remove the periodicity of the halftone dot pattern while preventing the excessive smoothing.

On the other hand, in order to apply a spatial filter, shaped in a parallelogram being same as the shape of one periodical area of the halftone dot pattern, to the image data concerned, the calculation processing, required for convolution arithmetic calculations, etc., has become complicated and cumbersome, resulting in the deterioration of the processing velocity and the complication of the hardware configuration.

SUMMARY OF THE INVENTION

To overcome the abovementioned drawbacks in conventional image processing apparatuses, it is one of objects of the present invention to provide an image processing apparatus, which makes it possible not only to accurately remove the periodicity of the halftone dot pattern from the image to be reproduced while suppressing the excessive smoothing, but also to reduce the processing burden of hardware and/or software included in the image processing apparatus concerned.

Accordingly, at least one of the objects of the present invention can be attained by any one of the image processing apparatuses described as follows.

(1) According to an image processing apparatus reflecting an aspect of the present invention, the image processing apparatus, comprises: a periodicity pattern analyzing section to analyze image data representing a processing objective image, so as to acquire periodicity information indicating a periodicity of a halftone dot pattern included in the processing objective image; a smoothing area determining section to determine a smoothing area, constituted by either a pair of rectangular areas contacting with each other or a single rectangular area, based on the periodicity information acquired by the periodicity pattern analyzing section; a spatial filter creating section to create a spatial filter within a size of which the smoothing area, determined by the smoothing area determining section, is includible, and in which a weighted coefficient of each of pixels, included in the spatial filter, is established corresponding to an overlapping area of a concerned pixel overlapping with the smoothing area included in the spatial filter; and a smoothing calculation section that applies a convolution arithmetic calculation processing to the image data representing the processing objective image with the spatial filter, created by the spatial filter creating section.

(2) According to another aspect of the present invention, in the image processing apparatus recited in item 1, the periodicity information specifies a parallelogram area being equivalent to one period of the halftone dot pattern, and a shape of the smoothing area, determined by the smoothing area determining section, is acquired by replacing a part of the parallelogram area with a same potion of another parallelogram area located adjacent to the parallelogram area.

(3) According to still another aspect of the present invention, in the image processing apparatus recited in item 1, the smoothing area determining section determines a method for arranging the pair of rectangular areas, corresponding to a condition designated.

(4) According to an image processing apparatus reflecting still another aspect of the present invention, the image processing apparatus, comprises: an inputting section to input image data, which represents a processing objective image, and to which periodicity information, indicating a periodicity of a halftone dot pattern included in the processing objective image, is attached; a smoothing area determining section to determine a smoothing area, constituted by either a pair of rectangular areas contacting with each other or a single rectangular area, based on the periodicity information attached to the image data inputted by the inputting section; a spatial filter creating section to create a spatial filter within a size of which the smoothing area, determined by the smoothing area determining section, is includible, and in which a weighted coefficient of each of pixels, included in the spatial filter, is established corresponding to an overlapping area of a concerned pixel overlapping with the smoothing area included in the spatial filter; and a smoothing calculation section that applies a convolution arithmetic calculation processing to the image data representing the processing objective image with the spatial filter, created by the spatial filter creating section.

(5) According to still another aspect of the present invention, in the image processing apparatus recited in item 4, the periodicity information specifies a parallelogram area being equivalent to one period of the halftone dot pattern, and a shape of the smoothing area, determined by the smoothing area determining section, is acquired by replacing a part of the parallelogram area with a same potion of another parallelogram area located adjacent to the parallelogram area.

(6) According to yet another aspect of the present invention, in the image processing apparatus recited in item 4, the smoothing area determining section determines a method for arranging the pair of rectangular areas, corresponding to a condition designated.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3(a) shows a schematic diagram indicating a conversion table to be employed for a color separation processing, while FIG. 3(b) shows an exemplary pair of conversion Equations to be employed for a color separation processing;

FIG. 13 shows an explanatory table indicting exemplary conditions to be employed when selecting a method of arranging a pair of rectangular areas;

DETAILED DESCRIPTION OF THE PREFERRED EMBODIMENT

Figure 1:
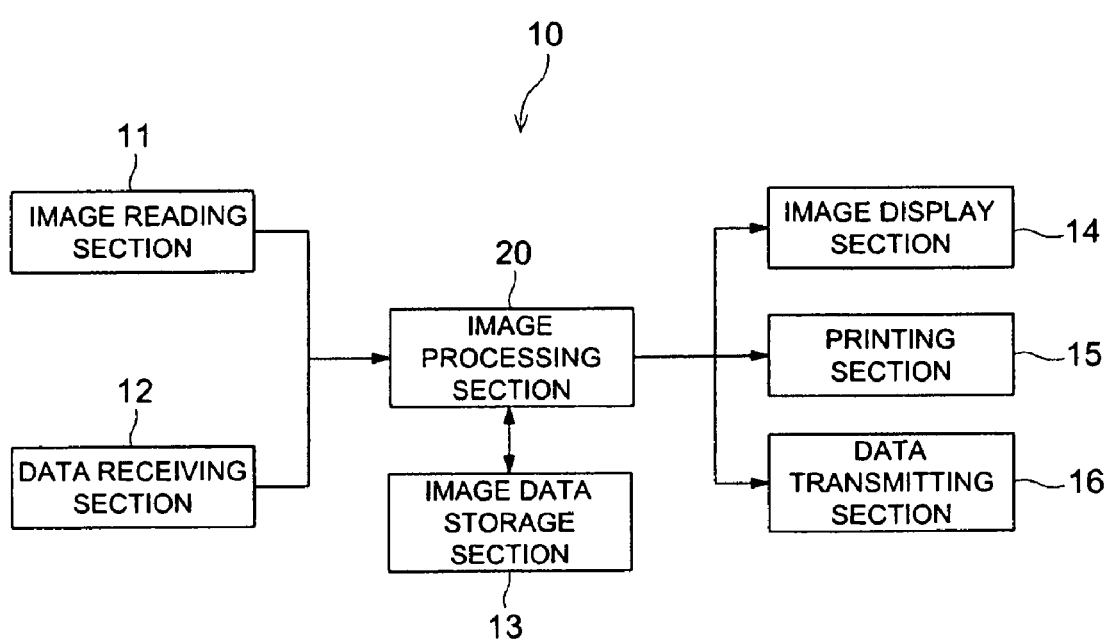
FIG. 1 shows a block diagram indicating an overall configuration of an image processing apparatus 10 embodied in the present invention.

Referring to the drawings, the preferred embodiment of the present invention will be detailed in the following.

FIG. 1 shows a block diagram indicating an overall configuration of an image processing apparatus 10 embodied in the present invention. The image processing apparatus 10 is constituted by an image reading section 11, a data receiving section 12, an image processing section 20, an image data storage section 13, an image display section 14, a printing section 15 and a data transmitting section 16. For instance, the image processing apparatus 10 is configured as a Multi Functional Apparatus that is provided with various kinds of functions, such as a function for copying a document, a printing function, a facsimile function, etc.

Each of the image reading section 11 and the data receiving section 12 serves as an inputting section from which image data representing an image to be processed (processing objective image) is inputted into the image processing apparatus 10. Specifically among them, the image reading section 11 also serves as an outputting section that reads an image included in the document as a color image so as to output digital image data corresponding to the read image. For this purpose, the image reading section 11 is constituted by an exposure scanning section including a light source and a mirror, a linear color image sensor that receives light reflected from the document so as to output electric signals (analogue image signals) representing intensity variations of the received light and respectively corresponding to plural primary colors, and various kinds of optical elements, such as mirrors, condenser lenses, etc., to guide the light reflected from the document toward the linear color image sensor. The analogue image signals outputted by the linear color image sensor are converted to, for instance, digital image data that represents each of the pixels in 256 gradation steps for every color component (each of primary colors employed), and then, is outputted from the image reading section 11.

Further, the data receiving section 12 serves as an image data receiving section that receives image data to be processed (processing objective image data), which has sent from an external terminal device, such as a personal computer, etc., through a communication path, such as a network, etc. It is also possible to receive the image data according to the facsimile procedure.

Still further, the digital image data outputted from either the image reading section 11 or the data receiving section 12 is inputted into the image processing section 20. In this connection, the digital image data to be inputted into the image processing section 20 represents an image formed in, so-called, a dot matrix format, in which the pixels are arranged on a lattice pattern formed by intersecting X direction (main-scanning direction) lines and Y direction (sub-scanning direction) lines, being orthogonal to the X direction lines, with each other. The image reading section 11 reads the two-dimensional image by moving the reading position of the linear color image sensor in the Y direction stepwise one line by one line while establishing each of the lines in the X direction as one line to be read by the linear color image sensor.

Still further, the image processing section 20 has a function for applying various kinds of image processing, such as a processing for removing a periodicity of halftone dot pattern, which is included in the image to be processed, an size enlargement/reduction processing, etc., to the processing objective image data inputted. Configurations and functions of the image processing section 20 will be detailed later on. In this connection, the halftone dot processing is a method for representing a halftone gradation by using the area modulation method.

Still further, the image data storage section 13 is coupled to the image processing section 20, so as to serve as storage to store either image data to be processed by the image processing section 20 or other image data already processed by the image processing section 20, therein. The image data storage section 13 is constituted by a semiconductor memory, an HDD (Hard Disc Drive), etc.

Still further, the image display section 14 has a function for displaying an image represented by the image data outputted from the image processing section 20. Other than the above, the image display section 14 is also provided with a function as an operating section to accept various kinds of inputting operations conducted by the user, such as a kind of processing to be applied by the image processing section 20, various kinds of instructions and setting items, etc. For instance, the image display section 14 is configured by a LCD (Liquid Crystal Display) provided with a touch panel on the circumferential surface of its screen and electronic circuits for controlling them.

Still further, the printing section 15 has a function for receiving the image data outputted from the image processing section 20 and forming an image represented by the received image data on a paper sheet so as to output a print of the image concerned.

Yet further, the data transmitting section 16 has a function for transmitting the image data outputted from the image processing section 20 to an external apparatus through a communication path, such as a network, etc. The data transmitting section 16 is provided with a function for transmitting an E-mail to which the image data is attached, another function for transmitting the image data according to the facsimile transmitting procedure, etc.

In addition to the abovementioned sections, the image processing apparatus 10 is also provided with a control section (not shown in the drawings) that totally controls operations to be performed in the image processing apparatus 10. The control section is constituted by various kinds of electronic circuits including a CPU (Central Processing Unit), a ROM (Read Only Memory) and a RAM (Random Access Memory) as its main processing circuits. The CPU executes programs stored in the ROM and developed on the RAM so as to control the overall operations to be performed in the image processing apparatus 10.

Figure 2:
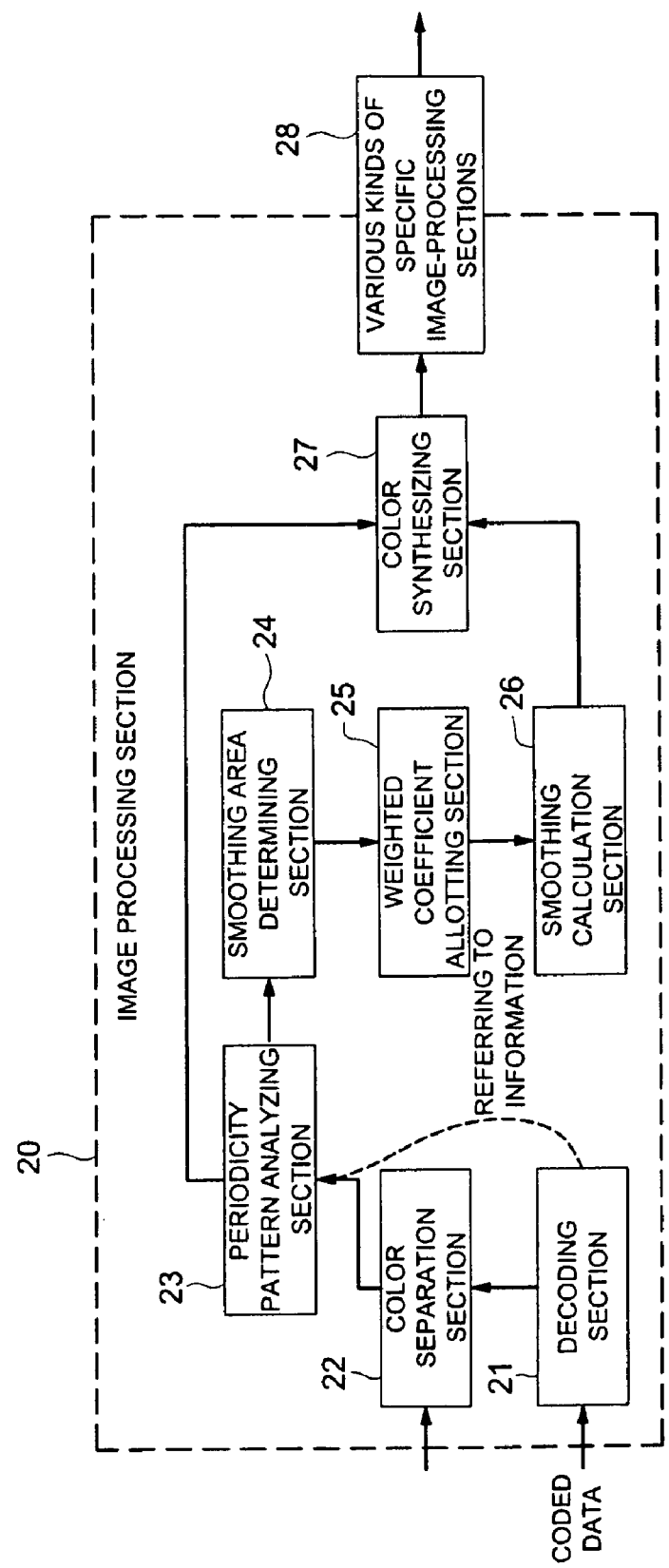
FIG. 2 shows a block diagram indicating an internal configuration of an image processing section provided in an image processing apparatus embodied in the present invention.

FIG. 2 shows a block diagram indicating an internal configuration of the image processing section 20. As shown in FIG. 2, the image processing section 20 is constituted by a decoding section 21, a color separation section 22, a periodicity pattern analyzing section 23, a smoothing area determining section 24, a weighted coefficient allotting section 25, a smoothing calculation section 26, a color synthesizing section 27 and various kinds of specific image-processing sections 28. It is applicable that the image processing section 20 is configured as a hardware circuit, including a sequencer that incorporates a micro-program, a logic circuit, etc., or otherwise, the CPU of the control section executes various kinds of predetermined programs so as to perform the function of the image processing section 20.

Further, the decoding section 21 parses a header section, etc. of an image file inputted from the data receiving section 12, so as to determine whether or not encoded data, derived from information in regard to a halftone-dot processed image area (halftone dot image area) included in the concerned image, is included in the header section. When determining that the encoded data is included in the header section, the decoding section 21 decodes the encoded data so as to acquire periodicity information representing the periodicity of the halftone dot pattern, and then, outputs the periodicity information to the periodicity pattern analyzing section 23. In addition, the decoding section 21 outputs image data acquired by removing the header section from the inputted image file to the color separation section 22.

Still further, the color separation section 22 serves as a section for applying a color separation processing to either the image data inputted from the image reading section 11 or the other image data inputted from the decoding section 21. For instance, when a color document, to which the halftone dot processing is applied with respect to each of color plates of color C (Cyan), color M (Magenta), color Y (Yellow) and color K (Black), is inputted as color image data based on color components of color R (Red), color G (Green) and color B (Blue), the color separation section 22 converts the color image data, based on the color components of colors R, G and B, to other image data based on other color components of colors C, M, Y and K so as to decompose the other image data into unicolor component image data sets of colors C, M, Y and K.

Figure 3:
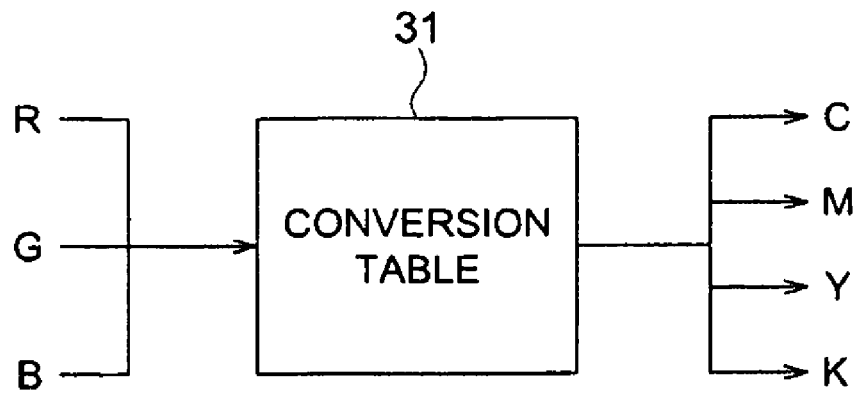

For instance, as shown in FIG. 3(*a*), a conversion table 31 representing the color reproduction characteristics is created in advance by correlating with the data acquired in advance by reading the color chart, so as to estimate the image data based on the color components of colors C, M, Y and K from the inputted image data based on the color components of colors R, G and B by employing the conversion table 31. Alternatively, it is also applicable that the Conversion Equations shown in FIG. 3(*b*) are employed for the abovementioned conversion process as a simplified way.

The various kinds of processing to be conducted in the periodicity pattern analyzing section 23, the smoothing area determining section 24, the weighted coefficient allotting section 25 and the smoothing calculation section 26, which are shown in FIG. 2, are applied to the inputted image data for every one of the halftone-dot processed image areas and for every one of the color components. The color synthesizing section 27 synthesizes image data sets, which are processed for every one of the color components in each of the halftone-dot processed image areas, so as to generate the processed color image data.

Further, the periodicity pattern analyzing section 23 analyzes the image data inputted from the color separation section 22 so as to detect the periodicity of the density variation, which is estimated as a halftone dot pattern to be included in the image represented by the image data concerned. In this connection, when the periodicity information is inputted into the periodicity pattern analyzing section 23 from the decoding section 21, the periodicity information concerned is utilized for the above purpose.

Still further, when the periodicity of the halftone dot pattern is detected, the periodicity pattern analyzing section 23 outputs both the periodicity information representing the detected periodicity and the image data, serving as processing objective image data, to the smoothing area determining section 24, in order to remove the periodicity of the halftone dot pattern. On the other hand, when the periodicity of the halftone dot pattern is not detected, the periodicity pattern analyzing section 23 outputs the concerned image data to the color synthesizing section 27, since it is not necessary to remove the periodicity of the halftone dot pattern.

Still further, based on the periodicity information inputted from the periodicity pattern analyzing section 23, the smoothing area determining section 24 determines a smoothing area that includes either a pair of rectangular areas contacting each other, or a single rectangular area.

Still further, the weighted coefficient allotting section 25 serves as a spatial filter, the size of which is capable of including the smoothing area determined by the smoothing area determining section 24, and also serves as a spatial filter creating section for creating a spatial filter in which a weighted coefficient for each of the pixels is established (weighted coefficients are allotted to the pixels) corresponding to an area overlapping with the smoothing area included in the spatial filter.

Still further, the smoothing calculation section 26 employs the spatial filter created by the weighted coefficient allotting section 25 to conduct the convolution arithmetic calculation with respect to the image data serving as processing objective image data. The processed image data, acquired by applying the convolution arithmetic calculation processing and the spatial filter processing to the image data inputted into the smoothing calculation section 26, is outputted to the color synthesizing section 27, in order to apply the color synthesizing processing thereto.

Yet further, the various kinds of specific image-processing sections 28 serve as sections for applying various kinds of image processing, such as a size enlargement/reduction processing, etc., to the image data inputted from the color synthesizing section 27. The various kinds of specific image-processing sections 28 are positioned at the final stage in the image processing section 20. Accordingly, the final image data outputted from the various kinds of specific image-processing sections 28 can be regarded as an overall processing result of the image processing section 20.

Figure 4:
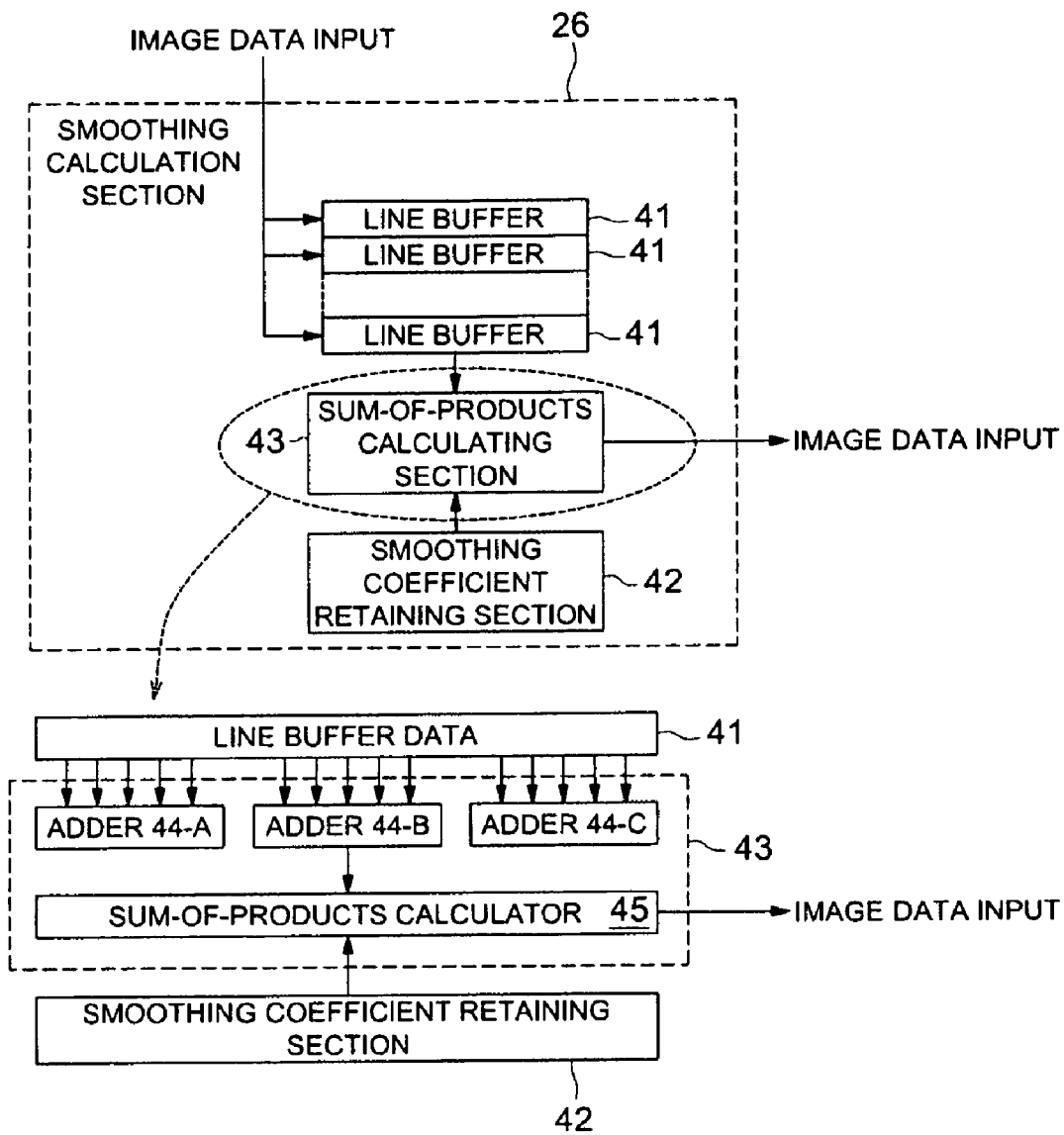
FIG. 4 shows a block diagram indicating a configuration of a smoothing calculation section provided in an image processing apparatus embodied in the present invention.

FIG. 4 shows a block diagram indicating a configuration of the smoothing calculation section 26. The smoothing calculation section 26 is provided with: a line buffer 41 to store one line image data representing a line image corresponding to one main-scanning line; a smoothing coefficient retaining section 42 to store each of the weighted coefficients (smoothing coefficients) of the spatial filter, established by the weighted coefficient allotting section 25; and a sum-of-products calculating section 43 to apply the convolution arithmetic calculation processing to each of the pixels read from the line buffer 41 by using the each of the weighted coefficients (smoothing coefficients) stored in the smoothing coefficient retaining section 42.

The sum-of-products calculating section 43 is constituted by a plurality of adders 44 and a sum-of-products calculator 45 to respectively multiply added results of the plurality of adders 44 and the smoothing coefficients together, and then, to sum up the multiplied results as indicated in the lower section shown in FIG. 4. When plural smoothing coefficients having the same value resides in the spatial filter concerned, each of the plurality of adders 44, included in the sum-of-products calculating section 43, adds the density values of the pixels to be multiplied by the same value of the plural smoothing coefficients abovementioned, before multiplying them together. The sum-of-products calculator 45 achieves the convolution arithmetic calculation in such a manner that each of multiplied results is acquired by multiplying a calculating result of each of the plurality of adders 44 and the corresponding one of the smoothing coefficients together, and then, the acquired multiplied results are summed up to derive the total sum.

For instance, when three kinds of smoothing coefficients, k1, k2 and k3 constitute the spatial filter, an adder 44-A sums up density values of pixels residing at positions at which the smoothing coefficient k1 is to be multiplied, and an adder 44-B sums up density values of pixels residing at positions at which the smoothing coefficient k2 is to be multiplied, while an adder 44-C sums up density values of pixels residing at positions at which the smoothing coefficient k3 is to be multiplied. Successively, the sum-of-products calculator 45 multiplies the output value of the adder 44-A by the smoothing coefficient k1, and multiplies the output value of the adder 44-B by the smoothing coefficient k2, while multiplies the output value of the adder 44-C by the smoothing coefficient k3, and then, sums up the three multiplied results, acquired in the above, so as to find the total sum. By utilizing the combining rule as abovementioned, the convolution arithmetic calculation can be simplified.

Figure 5:
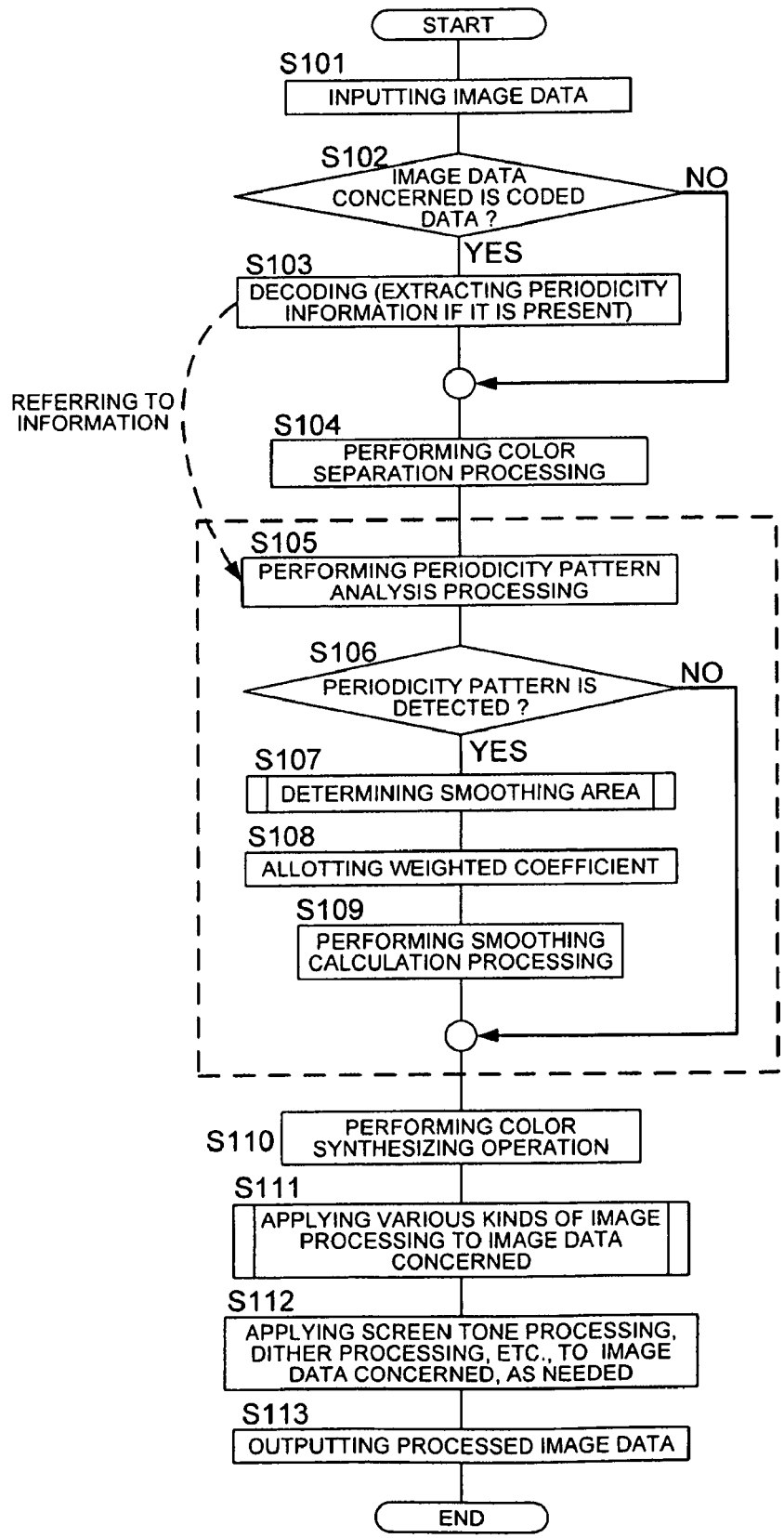
FIG. 5 shows a flowchart indicating a flow of an overall processing to be performed by an image processing apparatus embodied in the present invention.

FIG. 5 shows a flowchart indicating a flow of an overall processing to be performed by the image processing apparatus 10 configured as abovementioned. It is needless to say that the procedures of the overall processing indicated in the flowchart are performed under the controlling actions conducted by the aforementioned control section (not shown in the drawings) provided in the image processing apparatus 10. Initially, either the image reading section 11 or the data receiving section 12 acquires image data, serving as processing objective image data, and input the image data concerned, therein (Step S101). Successively, the control section determines whether the image data concerned is an image file or coded data that includes various kinds of coded information in its header section, etc., (Step S102). When determining that the image data concerned is the image file instead of the coded data (Step S102; No), the control section shifts the processing step to Step S104. On the other hand, when determining that the image data concerned is the coded data instead of the image file (Step S102; Yes), the decoding section 21 decodes coded data included in its header section, etc. If periodicity information is included in the coded data concerned as a result of the decode processing, the decoding section 21 outputs the periodicity information to the periodicity pattern analyzing section 23 (Step S103), and then, the control section shifts the processing step to Step S104.

Successively, the color separation section 22 performs the color separation processing (Step S104). Still successively, the periodicity pattern analyzing section 23 performs the periodicity pattern analysis processing (Step S105), so as to determine whether or not the periodicity pattern is detected (Step S106). When determining that the periodicity pattern is detected (Step S106; Yes), the smoothing area determining section 24, the weighted coefficient allotting section 25 and the smoothing calculation section 26 sequentially and successively apply the smoothing area determination processing (Step S107), the weighted coefficient allotment processing (creation processing of the spatial filter) (Step S108) and the smoothing calculation processing (Step S109) to the image data concerned, so as to remove the periodicity of the halftone dot pattern included in the processing objective image represented by the image data concerned, and then, the control section shifts the processing step to Step S110.

On the other hand, when determining that the periodicity pattern is not detected (Step S106; No), the control section directly shifts the processing step to Step S110 by skipping the processing to be performed in Step S107 through Step S109.

In this connection, when the periodicity information can be extracted from the image data in the processing of Step S103, the periodicity pattern analyzing section 23 determines that the periodicity pattern is detected (Step S106; Yes). Further, the processing operations to be performed in Step S105 through Step S109 (rectangular area of the flowchart, shown in FIG. 5, surrounded by the dotted line) are conducted for every halftone dot image area and for every color component. Concretely speaking, when a plurality of halftone-dot processed image areas (halftone dot image areas) resides within a single sheet of processing objective image, the processing operations to be performed in Step S105 through Step S109 are implemented for every halftone dot image area and for every color component. For instance, when halftone dot image area 1, representing photographic picture P1, resides on an upper-right portion of the processing objective image, while halftone dot image area 2, representing photographic picture P2, resides on a lower-left portion of the processing objective image, the processing to be performed in Step S105 through Step S109 are applied to halftone dot image area 1 for every color component, and further, the processing to be performed in Step S105 through Step S109 are applied to halftone dot image area 2 for every color component.

Still successively, the color synthesizing section 27 performs the color synthesizing operation (Step S110). Then, the various kinds of specific image-processing sections 28 applies various kinds of image processing, such as the size enlargement/reduction processing to fit the image size into a size established by the user or an image size required by the output side, etc., to the image data concerned as needed (Step S111), and further applies halftone dot processing, such as a screen tone processing, a dither processing, etc., to the image data concerned as needed (Step S112), so as to output the processed image data to the printing section 15 or the data transmitting section 16 (Step S113), and then, finalizes the processing (END).

Next, with respect to the processing to be performed in the periodicity pattern analyzing section 23, the smoothing area determining section 24, the weighted coefficient allotting section 25 and the smoothing calculation section 26, the further detailed explanations will be provided in the following.

Figure 6:
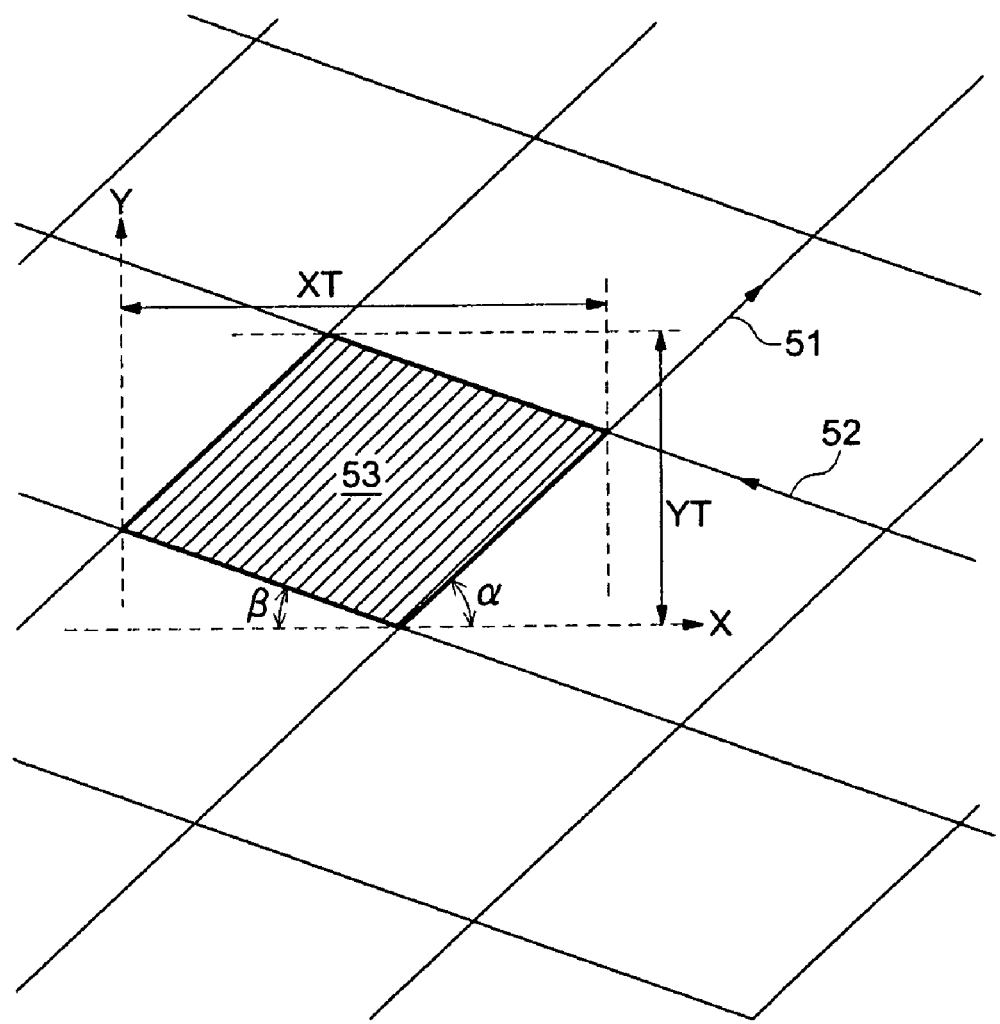
FIG. 6 shows an explanatory schematic diagram indicating an exemplary halftone dot pattern existing in a processing objective image.

FIG. 6 shows an explanatory schematic diagram indicating an exemplary halftone dot pattern existing in a processing objective image. Herein, it is assumed that two kinds of density variation periods, directions of which are different from each other, are intersect with each other so as to form the halftone dot pattern of the processing objective image. Each of a solid line 51, extended in a first direction, and a solid line 52, extended in a second direction, represents a line segment that connects high density points (or low density points), residing on the periodic pattern, to each other. Further, the intersection point of the solid line 51 extended in the first direction and the solid line 52 extended in the second direction represents a local maximum point of density (or a local minimum point of density). Herein, it is also assumed that an interval (period) of the solid line 51 extended in the first direction and another interval (period) of the solid line 52 extended in the second direction are kept constant, respectively. In this connection, it is applicable that the interval (period) of the solid line 51 extended in the first direction and the other interval (period) of the solid line 52 extended in the second direction are either equal to each other or different from each other. Further, a parallelogram area 53 filled with the diagonal lines, as shown in FIG. 6, is specified as a halftone dot pattern for one period (hereinafter, referred to as one-period halftone dot pattern).

Hereinafter, the following explanations will be based on the establishments indicated as follows. The establishments are defined as, $\alpha$: an angle between the solid line 51 in the first direction and the X-direction (horizontal direction in FIG. 6 and main-scanning direction of the image), $\beta$: an angle between the solid line 52 in the second direction and the X-direction ($0° \leq \alpha \leq 90°$, $-\alpha \leq \beta \leq 90°$, XT: a length of the parallelogram area 53 in the X-direction (period of the halftone dot pattern in the X-direction), and YT: a length of the parallelogram area 53 in the Y-direction (period of the halftone dot pattern in the Y-direction).

Figure 7:
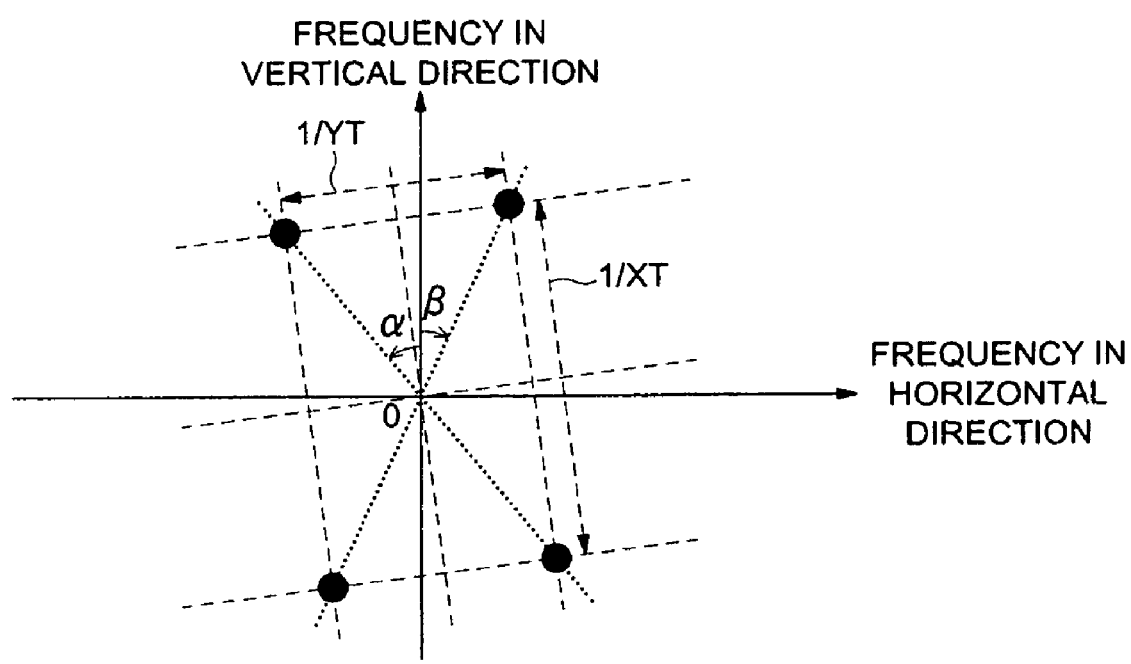
FIG. 7 shows an explanatory schematic diagram for explaining an exemplary analysis method for analyzing a periodicity of a halftone dot pattern (including parameters XT, YT, α, β), which is to be performed in a periodicity pattern analyzing section provided in an image processing apparatus embodied in the present invention.

FIG. 7 shows an explanatory schematic diagram for explaining an exemplary analysis method for analyzing the periodicity of the halftone dot pattern (including abovementioned parameters XT, YT, $\alpha$, $\beta$), which is to be performed in the periodicity pattern analyzing section 23. The black filed circles indicated in the schematic diagram shown in FIG. 7 represent positions at each of which a spectrum intensity of a frequency component is extremely strong (or weak), as a result of applying the two-dimensional Discrete Fourier Transform processing to the processing objective image data. By using the schematic diagram shown in FIG. 7, it is possible not only to analyze the inverse numbers of periods XT and YT, and angles $\alpha$ and $\beta$, but also to find the values of XT, YT, $\alpha$ and $\beta$ as the periodicity information of the halftone dot pattern concerned. Further, it is also possible to specify the shape of the parallelogram area 53 based on the periodicity information, including XT, YT, $\alpha$ and $\beta$, which are found in the above.

The scope of the analysis method for analyzing the periodicity of the halftone dot pattern is not limited to the above. Various kinds of other methods, such as the waveform pattern matching method, the orthogonal conversion method, etc., are applicable for the above purpose. Further, as aforementioned, the periodicity analysis of the halftone dot pattern is performed for every halftone dot unit area and for every color component included in the analyzing objective image.

Figure 8:
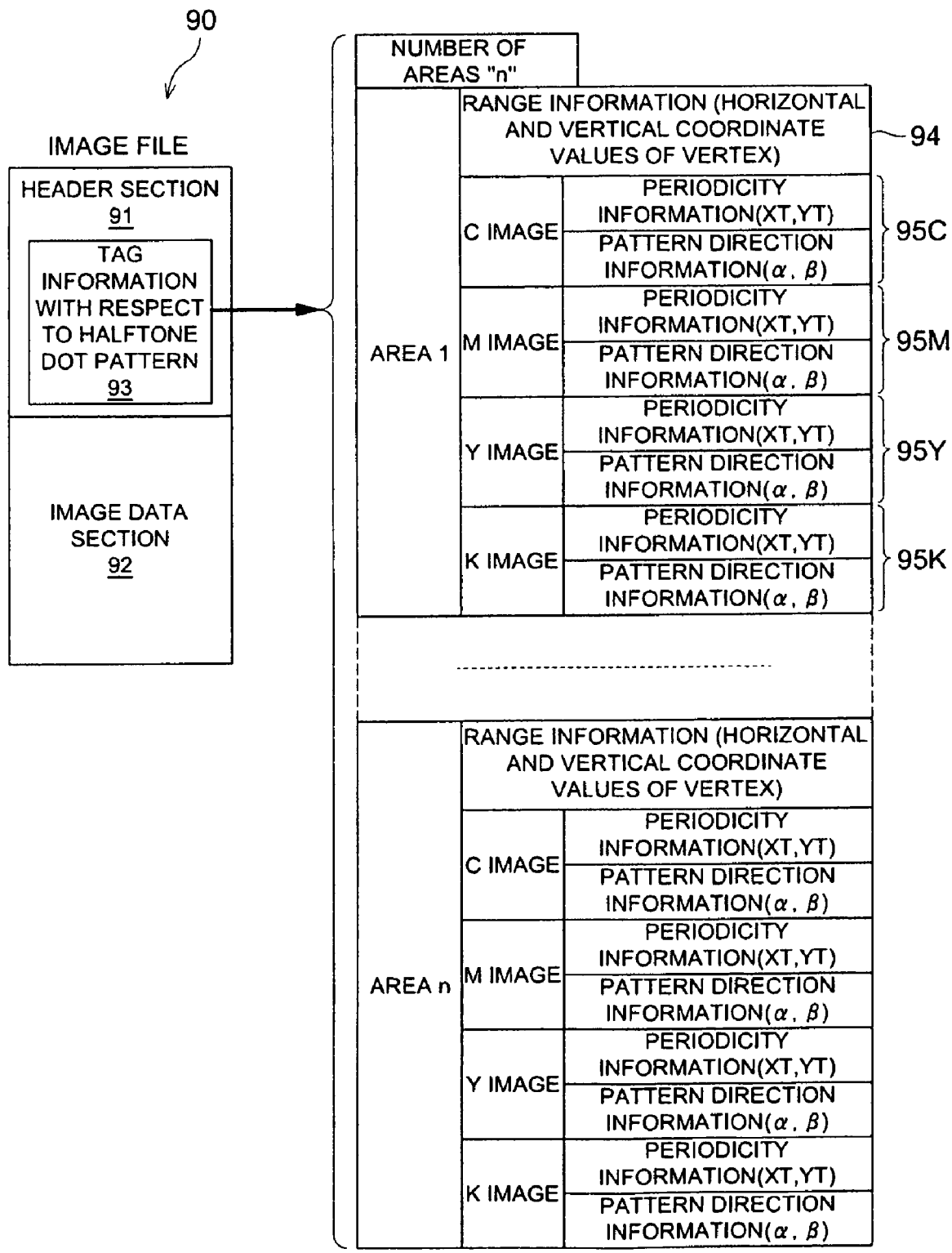
FIG. 8 shows an explanatory schematic diagram indicating an exemplary data structure of an image file including coded periodicity data acquired by coding periodicity information.

FIG. 8 shows an explanatory schematic diagram indicating an exemplary data structure of an image file 90 including coded periodicity data acquired by coding the periodicity information. The image file 90 is provided with a header section 91, in which header data, representing various kinds of information with respect to the image file 90 concerned, is stored, and an image data section 92 in which image data concerned is stored. The header section 91 also includes information (tag information 93) with respect to the halftone-dot processed image area (halftone-dot image area).

The tag information 93 includes a number of areas "n" that represents a number of halftone dot areas included in the image represented by the image file concerned, and with respect to each of halftone dot areas 1 through "n" (areas 1-"n") further includes: a positional information 94 that represents a position of the halftone dot area concerned; periodicity information 95C with respect to an image component of color C (Cyan) within the halftone dot area concerned, which includes the period information (XT, YT) and the pattern direction information ($\alpha$, $\beta$); periodicity information 95M with respect to an image component of color M (Magenta) within the halftone dot area concerned; periodicity information 95Y with respect to an image component of color Y (Yellow) within the halftone dot area concerned; and periodicity information 95K with respect to an image component of color K (Black) within the halftone dot area concerned.

When processing such the image file as abovementioned, the decoding section 21 pareses the tag information 93 with respect to the halftone dot area so as to determine whether or not a halftone dot area is included in the image file 90. When determining that a halftone dot area is included in the image file 90, the decoding section 21 retrieves the positional information 94 that represents the position(s) of the halftone dot area(s) included in the image concerned and the periodicity information 95C, 95M, 95Y and 95K for every color component, from the tag information 93 so as to output them to the periodicity pattern analyzing section 23. After that, by using the positional information 94 and the periodicity information 95C, 95M, 95Y and 95K, the smoothing area determining section 24, the weighted coefficient allotting section 25 and the smoothing calculation section 26 sequentially and successively apply corresponding processing to the image data concerned for every halftone dot image area and for every color component.

Figure 9:
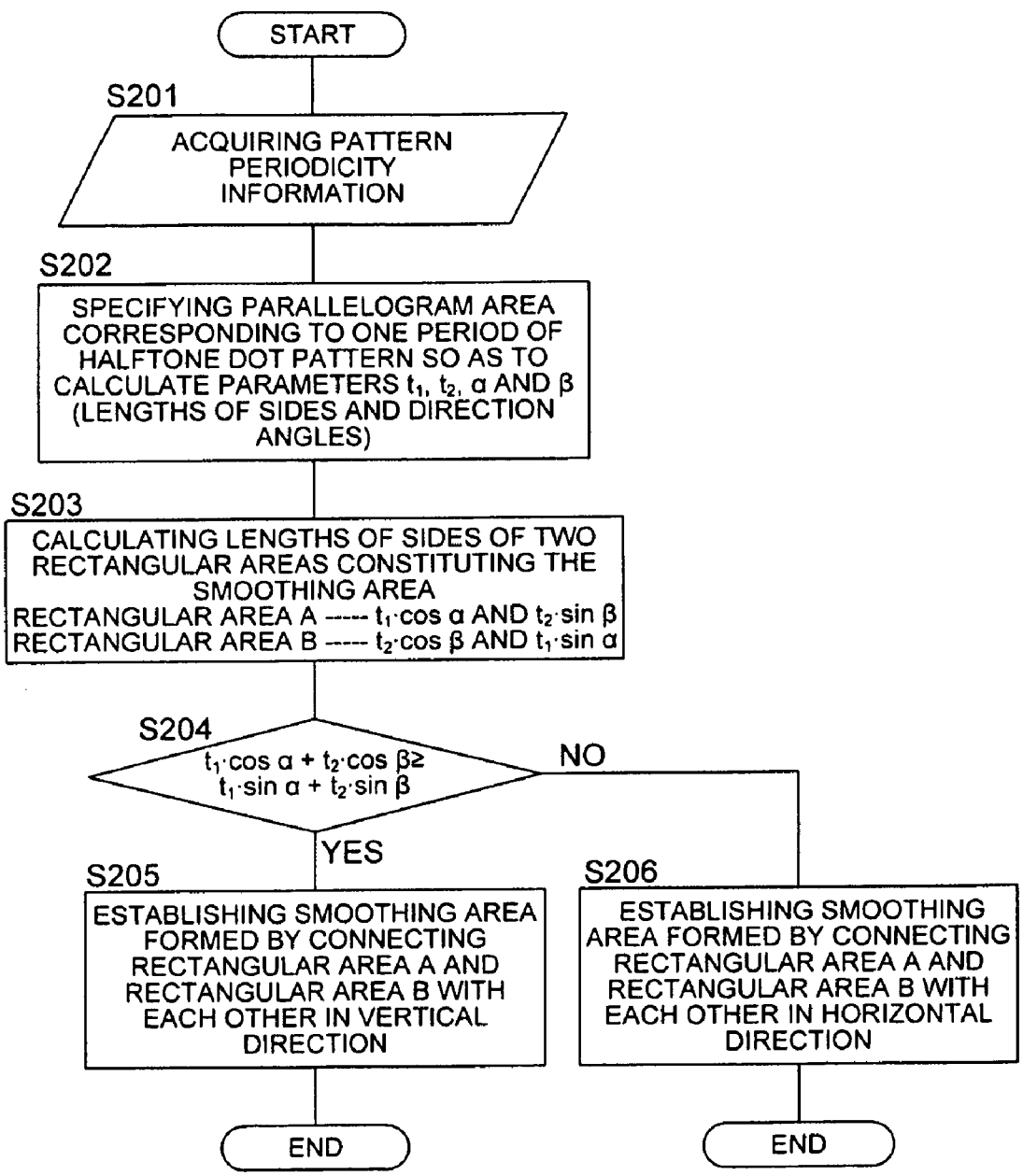
FIG. 9 shows a flowchart indicating a processing flow to be performed by a smoothing area determining section, for determining a smoothing area constituted by either a pare of rectangular areas contacting with each other or a single rectangular area.

FIG. 9 shows a flowchart indicating a processing flow, to be performed by the smoothing area determining section 24, for determining the smoothing area constituted by either a pair of rectangular areas contacting each other or a single rectangular area. At first, the smoothing area determining section 24 acquires the periodicity information (XT, YT, $\alpha$, $\beta$) from the periodicity pattern analyzing section 23 (Step S201), and then, specifies the parallelogram area 53 corresponding to one period of the halftone dot pattern based on the above-acquired periodicity information so as to calculate parameters t1, t2, $\alpha$ and $\beta$ (Step S202). The parameters t1, t2, are calculated by using the Equations indicated as follows.

$$t1 \times \cos\alpha + t2 \times \cos\beta = XT$$

$$t1 \times \sin\alpha + t2 \times \sin\beta = YT$$

Successively, lengths of the sides of two rectangular areas constituting the smoothing area are calculated, respectively, (Step S203). Concretely speaking, the length of the side in the X-direction (horizontal direction) of a rectangular area A can be found from the Equation of t1×cos $\alpha$ and the length of the side in the Y-direction (vertical direction) of the rectangular area A can be found from the Equation of t2×sin $\beta$, while, the length of the side in the X-direction (horizontal direction) of a rectangular area B can be found from the Equation of t2×cos $\beta$ and the length of the side in the Y-direction (vertical direction) of the rectangular area B can be found from the Equation of t1×sin $\alpha$.

Figure 10:
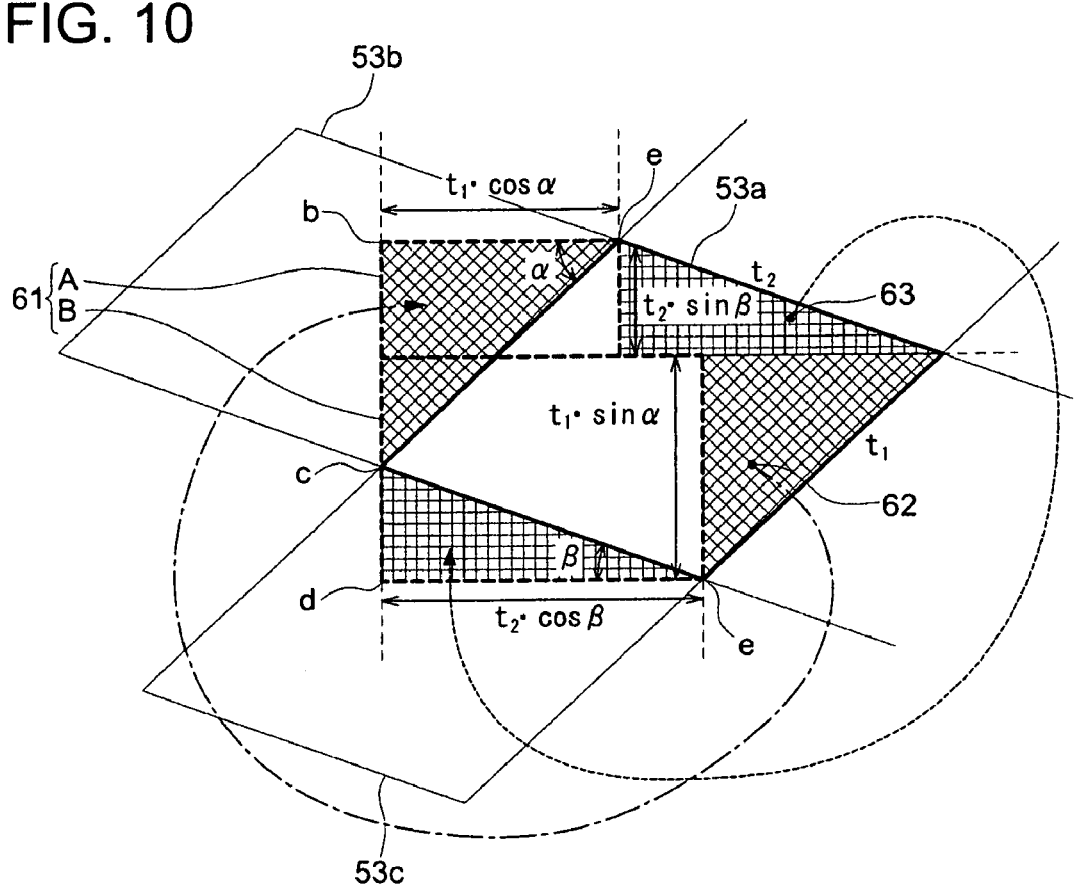
FIG. 10 shows an explanatory schematic diagram for explaining positional correspondence relationships between a parallelogram area, specified by periodicity information (XT, YT, α, β), and a pair of rectangular areas.
Figure 11:
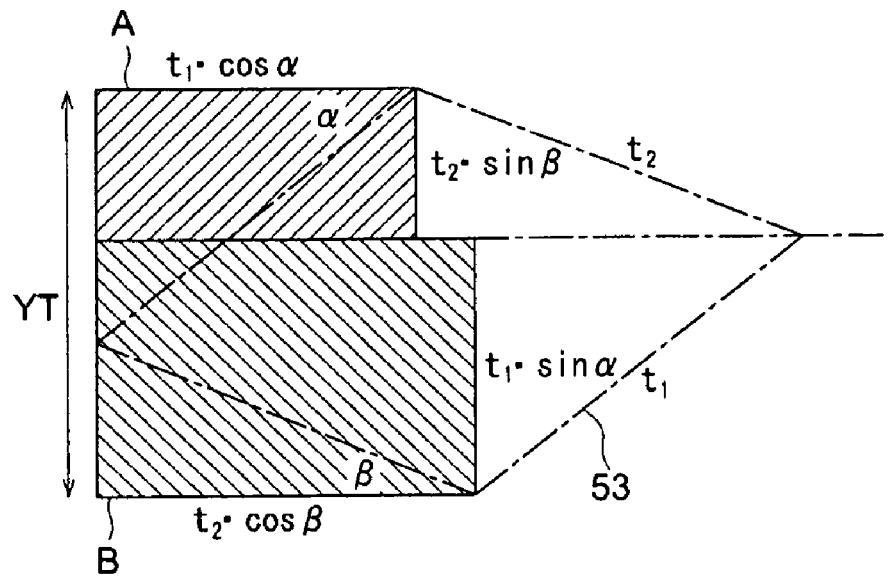
FIG. 11(a) and FIG. 11(b) show explanatory schematic diagrams indicating exemplary arrangements in each of which a pair of rectangular areas is arranged in a vertical direction.
Figure 11:
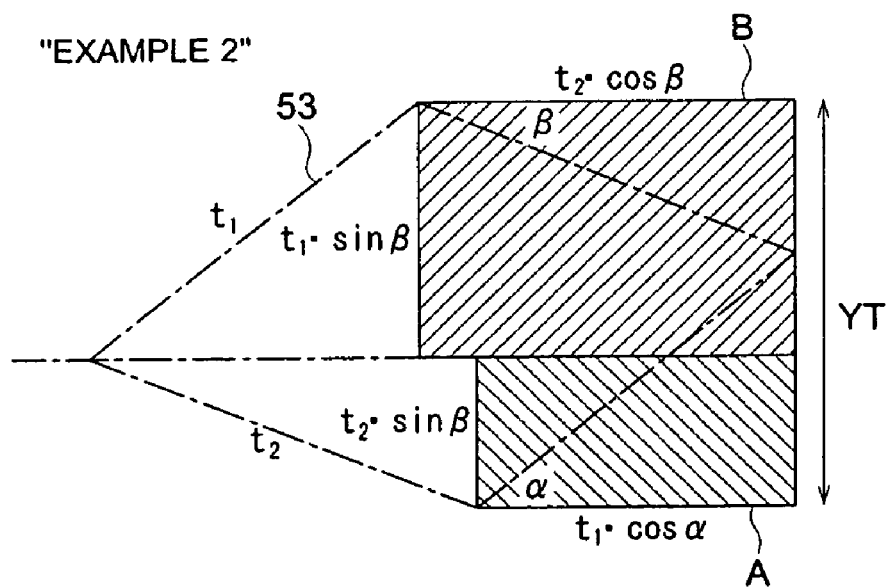

FIG. 11(a) shows a schematic diagram indicating an example of the parallelogram area 53 and the rectangular area A and the rectangular area B determined corresponding thereto, while, FIG. 10 shows an explanatory schematic diagram for explaining a size and a positional correspondence relationships between the parallelogram area 53 and the rectangular area A and the rectangular area B.

The shape of a smoothing area 61 constituted by two partial areas of the rectangular areas A, B, determined by the smoothing area determining section 24, is acquired by replacing a part of the parallelogram area 53 with a same potion of another parallelogram area 53' located adjacent to the parallelogram area 53. According to the example shown in FIG. 10, the smoothing area 61, constituted by the two partial areas of the rectangular areas A, B, is formed by replacing a sectional area 62, which is a rectangular triangle area located at a right-lower portion of a parallelogram area 53a, with the same area (triangle a-b-c) in a parallelogram area 53b located adjacent to the left-upper side of the parallelogram area 53a, and further, by replacing a sectional area 63, which is a rectangular triangle area located at a right-upper portion of the parallelogram area 53a, with the same area (triangle c-d-e) in a parallelogram area 53c located adjacent to the left-lower side of the parallelogram area 53a.

Accordingly, the area of the smoothing area 61 is the same as the original area of the parallelogram area 53. Further, since the parallelogram area 53 is periodically repeated as the halftone dot pattern, the portion of the parallelogram area, substituted by the same area of the adjacent parallelogram area, is the same area shifting by one period, and therefore, the periodicity of the halftone dot pattern can be maintained. In other words, since the halftone dot pattern (parallelogram area 53) is repeated with a period of XT in the horizontal direction and a period of YT in the vertical direction with respect to the image concerned, when the spatial filter processing is applied, it is possible to acquire the processing result being same as that acquired when the original parallelogram area is established as the smoothing area as it is, even if a part of the parallelogram area is replaced by the same area of the other parallelogram area located adjacent to the parallelogram area concerned.

Figure 12:
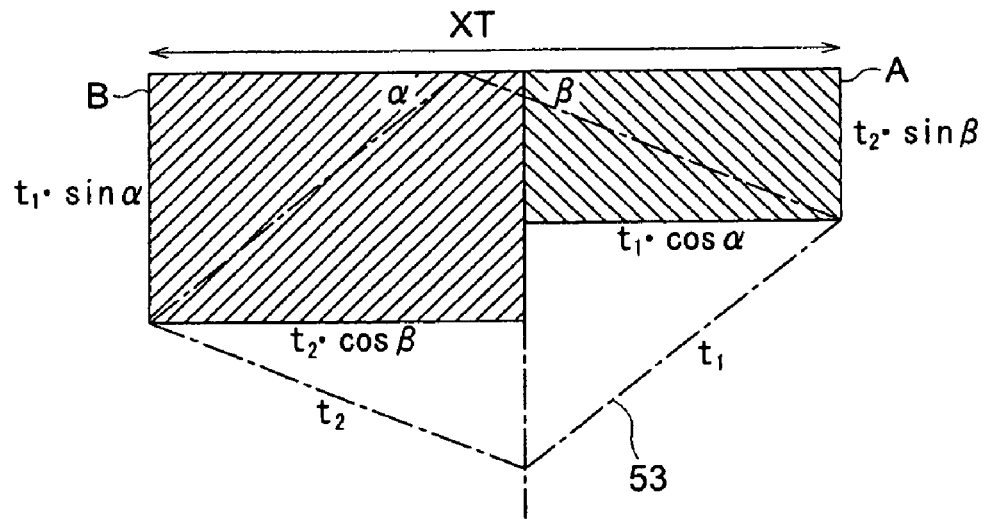
FIG. 12(a) and FIG. 12(b) show explanatory schematic diagrams indicating exemplary arrangements in each of which a pair of rectangular areas is arranged in a horizontal direction.
Figure 12:
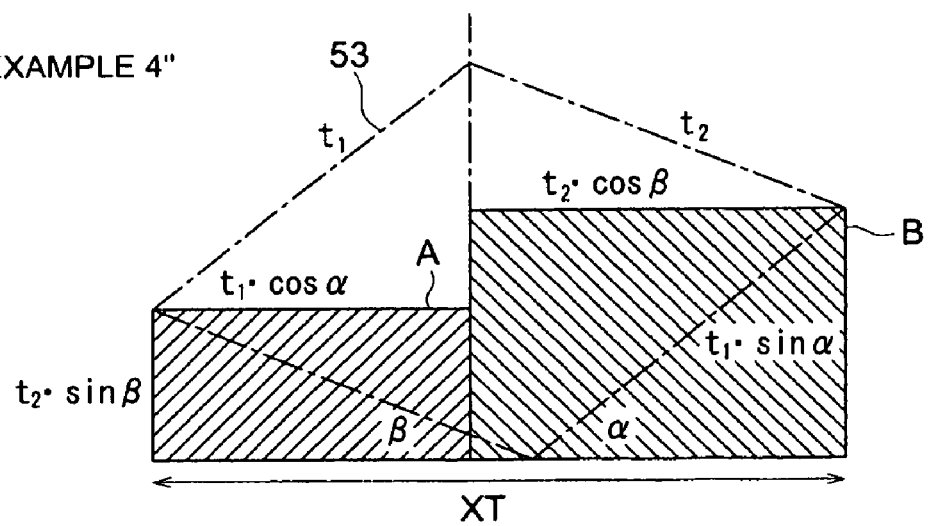

In this connection, with respect to the rectangular area A and the rectangular area B, it is sufficient to specify the sizes of them and the mutual relationship between the positions of them, and accordingly, the positional relationships between the parallelogram area 53 and the rectangular areas A, B are not specified. Further, even if the position of the smoothing area 61 constituted by the rectangular areas A, B varies, the image quality is not influenced at all, but merely an output position of the image would be shifted. Still further, as a matter of convenience for explaining the correspondence relationships between the sizes of the parallelogram area 53 and the rectangular areas A, B, the parallelogram area 53 and the rectangular areas A, B overlap with each other in the schematic diagram shown in FIG. 10, as well as FIG. 11 and FIG. 12.

After the rectangular areas A, B are determined on the basis of the periodicity information (XT, YT, $\alpha$, $\beta$) as aforementioned, the smoothing area determining section 24 select a method for arranging the rectangular areas A, B. According to the processing flow shown in FIG. 9, the rectangular areas A, B are arranged in such a manner that the combined shape formed by arranging the two of rectangular areas A, B becomes substantially quadrate as nearer as possible. Concretely speaking, the smoothing area determining section 24 compares a value (t1×cos $\alpha$+t2×cos $\beta$), derived by adding the lengths of horizontal sides of the rectangular areas A, B, with another value (t1×sin $\alpha$+t2×sin $\beta$), derived by adding the lengths of vertical sides of the rectangular areas A, B (Step S204), so as to select a smaller one (Step S205 or Step S206).

Since the smoothing area determining section 24 select the arranging method of the rectangular areas A, B so that the combined shape becomes substantially quadrate as nearer as possible, when the smooth processing is implemented by employing the smoothing area 61, it becomes possible to apply a homogeneous smooth processing to all directions of the concerned pixel. In this connection, in the case that the lengths of horizontal sides of the rectangular areas A, B are equal to each other when arranging the rectangular areas A, B in the vertical direction, or in the case that the lengths of vertical sides of the rectangular areas A, B are equal to each other when arranging the rectangular areas A, B in the horizontal direction, a single rectangular area can be formed by combining the rectangular areas A, B with each other.

As shown in FIG. 11(a), FIG. 11(b), FIG. 12(a) and FIG. 12(b), various kinds of arranging methods are applicable for this purpose. The arranging method shown in FIG. 11(a) is the same as that shown in FIG. 10, and is exemplified as "EXAMPLE 1" in which the rectangular areas A, B are arranged in the vertical direction. Further, the other arranging method shown in FIG. 11(b) is exemplified as "EXAMPLE 2" in which the rectangular areas A, B are arranged in the vertical direction. Still further, the still other arranging methods shown in FIG. 12(a) and FIG. 12(b) are exemplified as "EXAMPLE 3" and "EXAMPLE 4" in each of which the rectangular areas A, B are arranged in the horizontal directions, respectively.

FIG. 13 shows a table indicting other conditions to be employed when selecting the arranging method of the rectangular areas A, B. A restriction item 1 is such a condition that is employed when suppressing a number of line buffer memories from the hardware (memory) resource reduction point of view. In such a case that the total sum of the lengths of the vertical sides of the rectangular areas A, B when the rectangular areas A, B are arranged in the vertical direction is smaller than a maximum value of the line buffer (namely, a maximum length of image in the vertical direction of the image area concerned, which is memorable for the number of line buffer memories currently provided; Nmax) (when determining as Yes), the rectangular areas A, B can be aligned in either the vertical direction or the horizontal direction, and accordingly, the arranging method further depends on results of other restriction items. When determining as No, since the vertical length of the smoothing area concerned exceeds the maximum length Nmax, the smoothing area determining section 24 selects and determines the arranging method so as to arrange the rectangular areas A, B in the horizontal direction.

Further, a restriction item 2 is such a condition that is employed when suppressing a number of line buffer memories from the hardware (memory) resource reduction point of view. In such a case that the total sum of the lengths of the horizontal sides of the rectangular areas A, B when the rectangular areas A, B are arranged in the horizontal direction is smaller than a maximum length of the line buffer (namely, a length of one line; Mmax) (when determining as Yes), the rectangular areas A, B can be aligned in either the horizontal direction or the vertical direction, and accordingly, the arranging method further depends on results of other restriction items. When determining as No, since the horizontal length of the smoothing area concerned exceeds the maximum length Mmax, the smoothing area determining section 24 selects and determines the arranging method so as to arrange the rectangular areas A, B in the horizontal direction.

Yet further, a restriction item 3 is such a condition that is employed when processing a character, etc., which includes a thin line in a specific direction (for instance, in the Minchoutai, being a kind of font for Japanese Kanji, some lines directed sideway are very thin), so as not to loose the sharpness of the thin line in the smoothing process. Concretely speaking, the smoothing area determining section 24 determines whether or not the thin line included in the character concerned is directed to the horizontal direction, and when determining that the thin line is directed to the horizontal direction (determining as Yes), the smoothing area determining section 24 arranges the rectangular areas A, B in the horizontal direction in such a manner that both of them are adjacent to each other. According to the above, since the smoothing effect in the vertical direction is getting smaller, the sharpness of the thin line in the horizontal direction would be hardly lost. On the other hand, when determining as No, the smoothing area determining section 24 arranges the rectangular areas A, B in the vertical direction in such a manner that both of them are adjacent to each other. According to the above, since the smoothing effect in the horizontal direction is getting smaller, the sharpness of the thin line in the vertical direction would be hardly lost.

Still further, it is also applicable that a combination of plural restriction items is employed for the above purpose. For instance, it is also applicable that the system is so constituted that a priority order is allotted to each of the plural restriction items in advance, so as to sequentially conduct the judging operations of them in order of descending priorities to employ the arranging method specified by the restriction item for which the judging result becomes non-arbitral at first.

The weighted coefficient allotting section 25 creates the spatial filter corresponding to the smoothing area 61 determined by the smoothing area determining section 24, in order to determine the weighted coefficient thereof. Herein, the size (shape) of a spatial filter 71 is established as the minimum size that can include the smoothing area 61 determined by the smoothing area determining section 24 (being equal to N×M pixels, it is preferable that both N and M are positive integer numbers, each of which is equal to or greater than 3). Then, the weighted coefficient allotting section 25 superimposes the smoothing area 61 on the spatial filter 71 having the size of N×M pixels established in the above, so as to establish the weighted coefficient for each of pixel positions included in the spatial filter 71, corresponding to an overlapping area between the smoothing area 61 and the pixel concerned.

Figure 14:
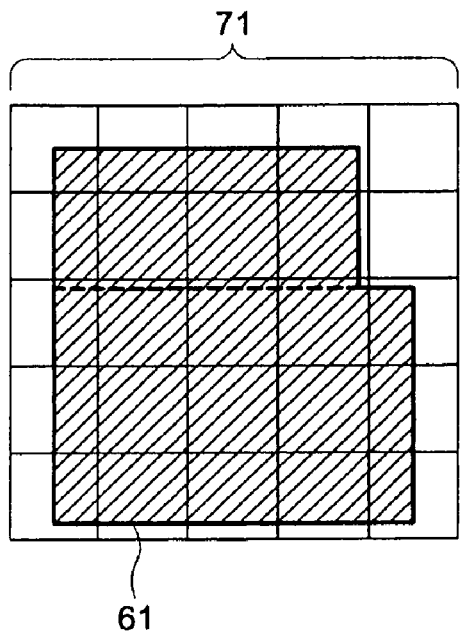
FIG. 14(a) shows an exemplary schematic diagram indicating a state of superimposing a smoothing area on an area of a spatial filter having a size of 5×5 pixels.
FIG. 14(b) shows an exemplary schematic diagram indicating weighted coefficients corresponding to overlapping areas between a smoothing area and pixels of the spatial filter.
FIG. 14(c) shows an exemplary schematic diagram indicating normalized weighted coefficients, acquired by normalizing the weighted coefficients shown in FIG. 14(b)

FIG. 14(a) shows an exemplary schematic diagram indicating a state of superimposing the smoothing area 61 on an area of the spatial filter 71 having a size of 5×5 pixels, FIG. 14(b) shows an exemplary schematic diagram indicating the overlapping areas between the smoothing area 61 and the concerned pixels, shown in FIG. 14(a), with numeral values (value of whole overlapping is set at 1), and FIG. 14(c) shows an exemplary schematic diagram indicating the weighted coefficients, which are normalized in such a manner that the total sum of the overlapping areas, shown in FIG. 14(b), becomes equal to 1. Namely, the normalized values, shown in FIG. 14(c), are determined as the weighted coefficients of the spatial filter concerned. In the present embodiment, in order to represent the dimension and the shape of the smoothing area 61, which is to be established as an arbitral size, by employing a set of discrete pixels, the weighted coefficient allotting section 25 conducts the weighting operation corresponding to the overlapping area, so as to determine the weighted coefficient of each of the pixels.

By using the spatial filter (weighted coefficients) created by the weighted coefficient allotting section 25, the smoothing calculation section 26 performs the convolution arithmetic calculation while setting each of the pixels, included in the processing objective image, as a concerned pixel. More concretely speaking, the convolution arithmetic calculation is conducted by retaining the each of the weighted coefficients (smoothing coefficients), included in the spatial filter 71, in the smoothing coefficient retaining section 42 shown in FIG. 4.

Figure 15:
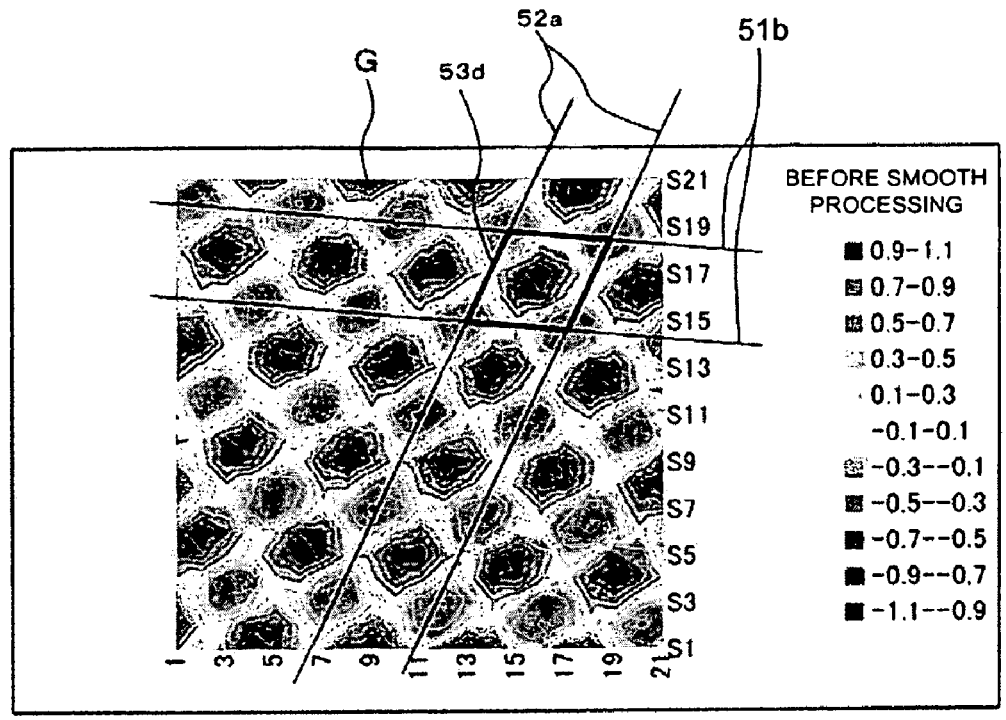
FIG. 15(a) shows a drawing illustrating a density distribution of an image, a halftone dot pattern of which has a periodicity.
FIG. 15(b) shows a drawing illustrating another density distribution of another image acquired by applying a smoothing processing to the image shown in FIG. 15(a).
Figure 15:
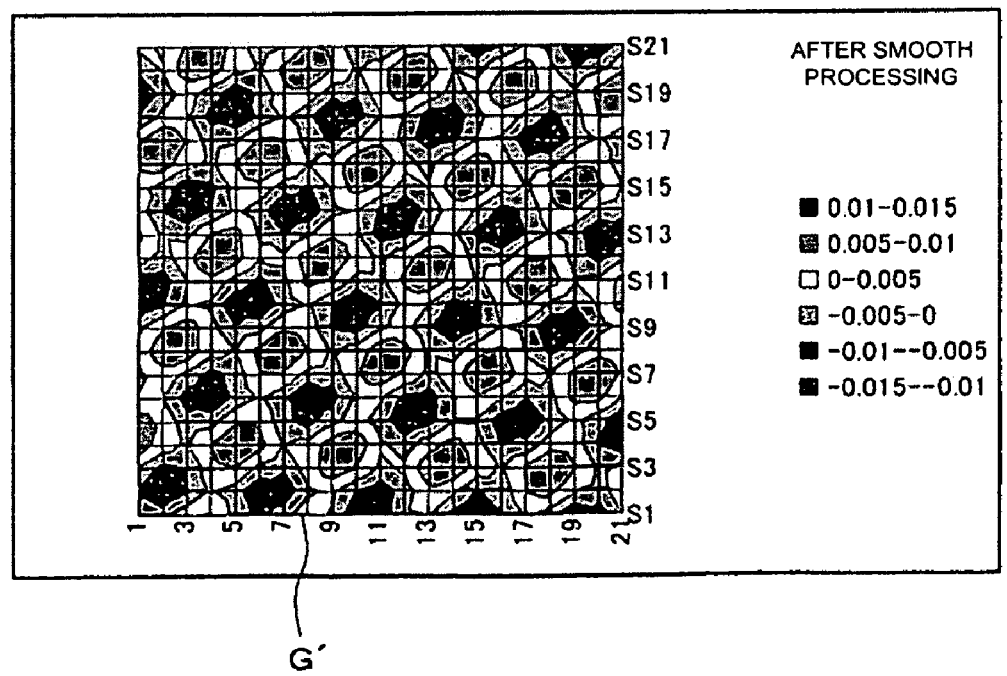

FIG. 15(a) shows a drawing illustrating a density distribution of an image G representing a predetermined and uniform intermediate density area as a halftone dot pattern. On the other hand, FIG. 15(b) shows another drawing illustrating an example of a processing result to be acquired at the time when the smoothing processing is applied to the image data, representing the image G having a periodicity in its halftone dot pattern, by employing the spatial filter 71. Further, FIG. 15(b) shows a density distribution of an image G' acquired by using the spatial filter 71 shown in FIG. 14(*c*) to apply the convolution arithmetic calculation to the image G shown in FIG. 15(*a*).

As shown in FIG. 15(*a*), in the image G before applying the smooth processing, the periodical density variation can be considerably recognized and the density variation is in a range of −0.9-+0.9. As a result of analyzing the image G in the periodicity pattern analyzing section 23, a pair of solid lines 51*a* extended in the first direction and another pair of solid lines 51*b* extended in the second direction are extracted so as to acquire a parallelogram area 53*d*, serving as a halftone dot pattern for one period. The smoothing area is determined (derived) from the parallelogram area 53*d* acquired in the above, and then, the spatial filter 71 is created. The values of the periodical density variations in the image G', acquired by applying the smooth processing using the spatial filter 71, fall within a range of −0.01-+0.01, and therefore, the periodicity of the halftone dot pattern is substantially eliminated from the image G'. Further, it is possible to leave the image components other than the halftone dot pattern (periodic pattern) as having a resolution being substantially equal to that of the halftone dot pattern (periodic pattern).

Referring to the drawings, the preferred embodiments of the present invention have been detailed in the foregoing. However, the scope of the present invention is not limited to the embodiments described in the foregoing. Modifications and additions, made by a skilled person without departing from the spirit and scope of the invention, shall be included in the scope of the present invention.

For instance, although the color image is exemplified as the processing objective image in the embodiment described in the foregoing, it is needless to say that a monochrome image is also applicable as the processing objective image, as well. In this case, both the color separation processing and the color synthesizing operation become unnecessary.

According to the image processing apparatus embodied in the present invention, it becomes possible not only to accurately remove the periodicity of the halftone dot pattern from the image to be reproduced, while suppressing the excessive smoothing, but also to implement the processing for removing the periodicity of the halftone dot pattern from the image concerned, while reducing the processing burden of hardware and/or software included in the image processing apparatus concerned.

While the preferred embodiments of the present invention have been described using specific term, such description is for illustrative purpose only, and it is to be understood that changes and variations may be made without departing from the spirit and scope of the appended claims.

What is claimed is:

1. An image processing apparatus, comprising:
a periodicity pattern analyzing section to analyze image data representing a processing objective image, so as to acquire periodicity information indicating a periodicity of a halftone dot pattern included in the processing objective image;
a smoothing area determining section to determine a smoothing area, constituted by either a pair of rectangular areas contacting with each other or a single rectangular area, based on the periodicity information acquired by the periodicity pattern analyzing section;
a spatial filter creating section to create a spatial filter in which a size of the spatial filter at least includes the smoothing area, and in which a weighted coefficient of each pixel included in the spatial filter is established corresponding to an overlapping area of each pixel that overlaps with at least a portion of the smoothing area included in the spatial filter; and
a smoothing calculation section that applies a convolution arithmetic calculation processing to the image data representing the processing objective image with the spatial filter, created by the spatial filter creating section.

2. The image processing apparatus of claim 1,
wherein the periodicity information specifies a parallelogram area being equivalent to one period of the halftone dot pattern, and
wherein a shape of the smoothing area, determined by the smoothing area determining section, is acquired by replacing a part of the parallelogram area with a same potion of another parallelogram area located adjacent to the parallelogram area.

3. The image processing apparatus of claim 1,
wherein the smoothing area determining section determines a method for arranging the pair of rectangular areas, corresponding to a condition designated.

4. An image processing apparatus, comprising:
an inputting section to input image data, which represents a processing objective image, and to which periodicity information, indicating a periodicity of a halftone dot pattern included in the processing objective image, is attached;
a smoothing area determining section to determine a smoothing area, constituted by either a pair of rectangular areas contacting with each other or a single rectangular area, based on the periodicity information attached to the image data inputted by the inputting section;
a spatial filter creating section to create a spatial filter in which a size of the spatial filter at least includes the smoothing area, and in which a weighted coefficient of each pixel included in the spatial filter is established corresponding to an overlapping area of each pixel that overlaps with at least a portion of the smoothing area included in the spatial filter; and
a smoothing calculation section that applies a convolution arithmetic calculation processing to the image data representing the processing objective image with the spatial filter, created by the spatial filter creating section.

5. The image processing apparatus of claim 4,
wherein the periodicity information specifies a parallelogram area being equivalent to one period of the halftone dot pattern, and
wherein a shape of the smoothing area, determined by the smoothing area determining section, is acquired by replacing a part of the parallelogram area with a same potion of another parallelogram area located adjacent to the parallelogram area.

6. The image processing apparatus of claim 4,
wherein the smoothing area determining section determines a method for arranging the pair of rectangular areas, corresponding to a condition designated.

* * * * *